United States Patent

Hwang et al.

(10) Patent No.: US 6,484,076 B2
(45) Date of Patent: Nov. 19, 2002

(54) AUTOMATED-GUIDED VEHICLE AND METHOD FOR CONTROLLING EMERGENCY STOP THEREOF

(75) Inventors: Gyu-dong Hwang, Suwon (KR); Yu-dong Won, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/765,634

(22) Filed: Jan. 22, 2001

(65) Prior Publication Data

US 2002/0007235 A1 Jan. 17, 2002

(30) Foreign Application Priority Data

Jul. 14, 2000 (KR) ........................................ 2000-40700

(51) Int. Cl.[7] .............................. G05B 9/02; G05D 1/00
(52) U.S. Cl. ..................................................... 701/23
(58) Field of Search ............................ 701/23; 318/587, 318/364, 672, 568.12; 901/1, 49

(56) References Cited

U.S. PATENT DOCUMENTS 4,860,209 A * 8/1989 Sugimoto et al. .......... 180/169
5,115,176 A * 5/1992 White et al. ................ 180/325
5,587,640 A  12/1996 Ek et al. ..................... 318/638
5,903,123 A  5/1999 Shimogama ........... 318/568.13

FOREIGN PATENT DOCUMENTS

JP          59-176861       10/1984
JP          61-101802       5/1986
JP          1-310927        12/1989

* cited by examiner

*Primary Examiner*—Michael J. Zanelli
(74) *Attorney, Agent, or Firm*—Staas & Halsey LLP

(57) ABSTRACT

Disclosed is an automated-guided vehicle having a driver, comprising an emergency stop switch for selecting an emergency stop and a release of the emergency stop of the driver; a state detector part for detecting a selection state of the emergency stop switch; and an emergency stop driving circuit for stopping in emergency an operation of the driver or releasing the emergency stop thereof according to a detection signal from the state detector part. With this configuration, where an emergency situation such as stoppage of the CPU occurs, the driver of the AVG can be stopped by the emergency stop switch, and therefore, the AGV can be more safely stopped.

20 Claims, 5 Drawing Sheets

AUTOMATED-GUIDED VEHICLE AND METHOD FOR CONTROLLING EMERGENCY STOP THEREOF

FIELD OF INVENTION

The present invention relates in general to automated-guided vehicles and methods for controlling an emergency stop thereof, and more particularly, to an automated-guided vehicle (hereinafter, "AGV") having a switch to stop the AGV in emergency (hereinafter, "emergency stop switch") and a method for controlling the emergency stop thereof.

DESCRIPTION OF RELATED ART

Generally, an AGV automatically conveys an article by means of a motor and a controller such as a central processing unit (hereinafter, "CPU") preprogrammed for an automatic operation.

The AGV is provided with an emergency stop switch to stop the AGV in emergency such as malfunction due to a short circuit, etc. If a user presses the emergency stop-switch, an emergency stop signal is inputted into the CPU, and the CPU interrupts a power supply to the driver to thereby stop an operation of the AGV. If the emergency stop switch is released, a release signal is transmitted to the CPU to thereby release the emergency stop of the AGV.

According to the conventional method to suspend the AGV in emergency, however, the emergency stop signal is transmitted to the CPU through an I/O circuit in the occurrence of emergency, and the CPU then issues a command of stopping the AGV. In this regard, if there is an emergency such as down of the CPU, etc., it is impossible to control an operation of the AGV. If the CPU is down while the AGV is in operation, the travelling path of the AGV cannot be determined, thus causing an emergency situation. Since the emergency stop is conducted by a software preprogrammed in the CPU according to the conventional emergency stop method, it is impossible to control an operation of the AGV, thereby being unable to stop the AGV.

SUMMARY OF THE INVENTION

Accordingly, the present invention has been made keeping in mind the above-described shortcoming, and an object of the present invention is to provide an AGV provided with an emergency stop switch which is used for stopping a driver of the, AGV where a CPU is down, and a method for controlling the emergency stop of the AGV.

This and other objects of the present invention may be achieved by a provision of an automated-guided vehicle having a driver, comprising an emergency stop switch for selecting an emergency stop and a release of the emergency stop of the driver; a state detector part for detecting a selection state of the emergency stop switch; and an emergency stop driving circuit for stopping in emergency an operation of the driver or releasing the emergency stop thereof according to a detection signal from the state detector part.

The automated-guided vehicle further comprises a delay circuit supplying an emergency stop signal from the state detector part to the emergency stop driving circuit, after delaying the signal for a predetermined time.

The delay circuit is comprised of a timer for adjusting the delay time.

The state detector part is comprised of a circuit for detecting the emergency stop signal and a circuit for detecting a release signal of the emergency stop.

The state detector part is comprised of at least one inverter converting each signal, a resistor and a capacitor for storing the converted signal therein and delaying the signal for the predetermined time, and a NAND gate into which the signal is inputted, outputting a pulse signal.

The emergency stop signal is converted by the inverter in the emergency stop signal detecting circuit; the converted signal is then divided, one divided signal being inputted into a first input port of the NAND gate passing through the inverter, and the other divided signal being converted by the inverter and inputted into the resistor and a storage circuit of the capacitor, and if the signal stored in the capacitor is entered into a second input port of the NAND gate after being inverted by the inverter, the on pulse signal is detected by outputting from the NAND gate, thereby driving the delay circuit.

The emergency stop signal detecting circuit is comprised of at least one inverter, a resistor, a capacitor, and a NAND gate.

The emergency stop release signal is divided in the emergency stop release signal detecting circuit; one divided signal is inputted into a first input port of the NAND gate; and the other divided signal is inputted into the resistor and a storage circuit of the capacitor through the inverter, and the signal stored in the capacitor is converted by the inverter and the inputted into a second input port of the NAND gate, the NAND gate outputs an off pulse signal according to the signals inputted thereinto; and the release of the emergency stop is conducted by the off pulse signal.

A method for controlling an emergency stop of an automated-guided vehicle having a driver, comprises the steps of selecting an emergency stop; detecting an emergency stop signal generated according to the selection of the emergency stop; activating an emergency stop driving circuit after delaying the emergency stop signal for a predetermined time; and turning off a power supply to the driver responsive to the activation of the emergency stop driving circuit.

The method further comprises the steps of releasing the emergency stop; and supplying the power to the driver responsive to the release of the emergency stop.

BRIEF DESCRIPTION OF THE DRAWINGS

The present invention will be better understood and its various objects and advantages will be more fully appreciated from the following description taken in conjunction with the accompanying drawings, in which.

DETAILED DESCRIPTION OF THE PREFERRED EMBODIMENTS

Figure 1:
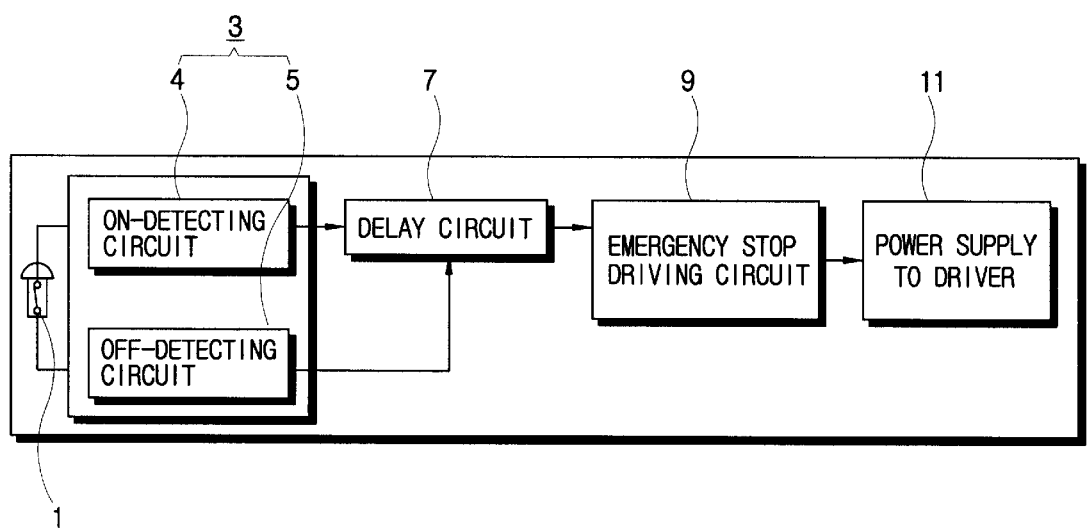
FIG. 1 is a block diagram of an emergency stop device of an AGV according to the present invention.

Referring to FIG. 1, an emergency stop device according to the present invention is comprised of an emergency stop switch 1 provided with a push button switch (not shown) which is locked by pressing it. Within the emergency stop switch 1 is installed a contact switch (not shown) which is open if the switch 1 is not pressed.

The emergency stop device is comprised of an on/off state detector part 3 having an on-detecting circuit 4 and an off-detecting circuit 5, detecting an on/off state of the emergency stop switch 1. The emergency stop device is comprised of a delay circuit 7 stopping the AGV in emergency after delaying for a predetermined period of time when it is determined through the on-detecting circuit 4 that the emergency stop switch 1 is on, and an emergency stop driving circuit 9 interrupting a power supply to a driver (not shown).

Figure 2:
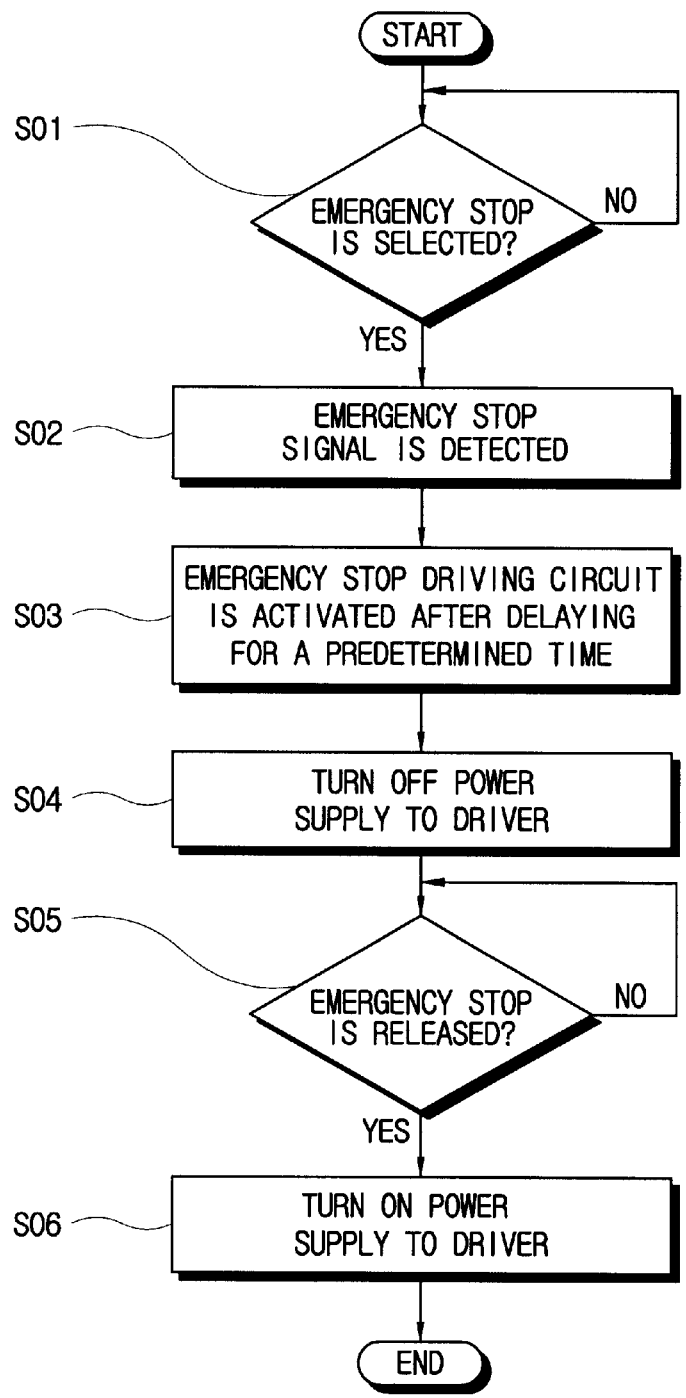
FIG. 2 is a control flow diagram of a method for controlling an emergency stop of the AGV of FIG. 1.
Figure 3:
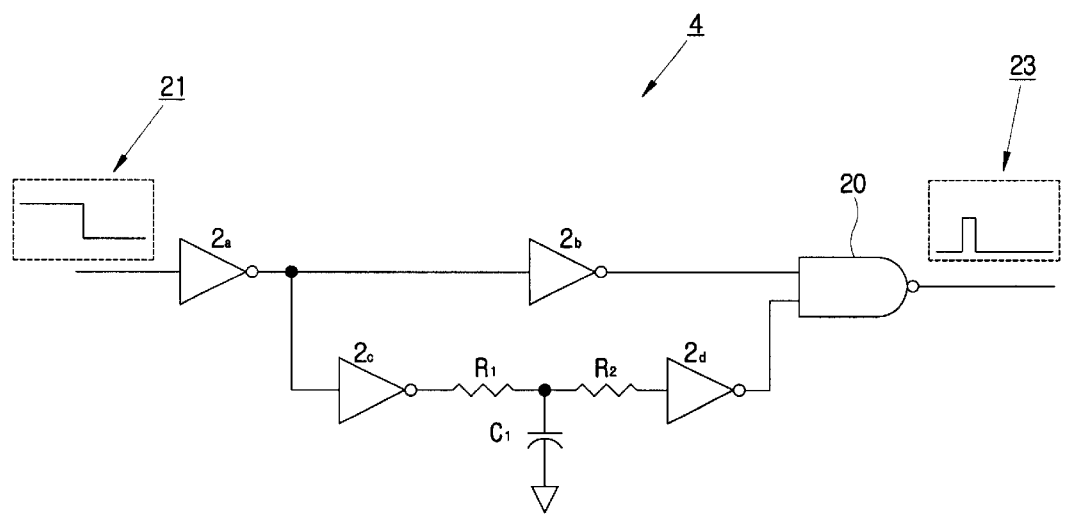
FIG. 3 is a circuit diagram of detecting an "on" state of the emergency stop device of FIG. 1.
Figure 4:
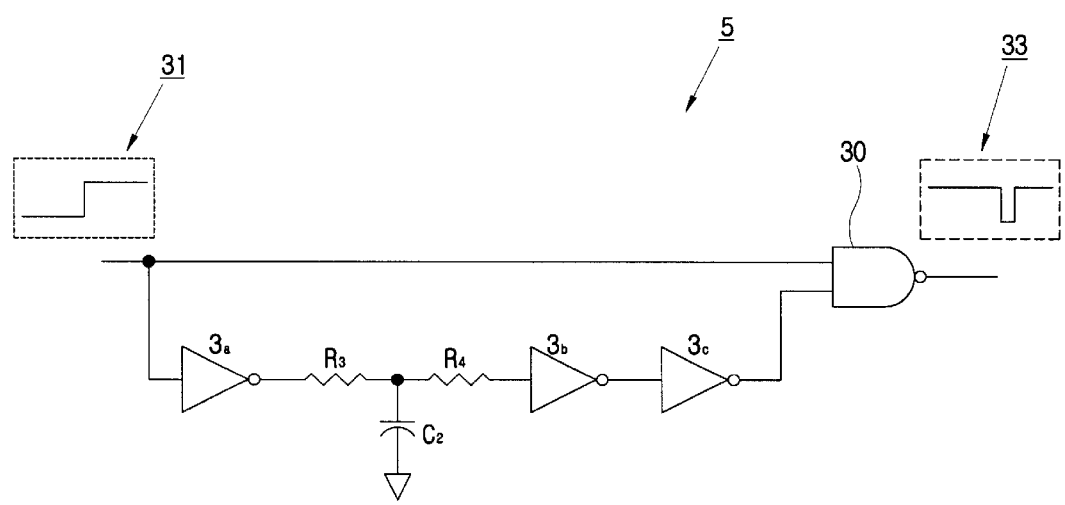
FIG. 4 is a circuit diagram of detecting an "off" state of the emergency stop device of FIG. 1.

Referring to FIGS. 2, 3 and 4, if the emergency stop switch 1 is pressed (S01), the contact switch is closed and a low-signal is supplied to the on-detecting circuit 4. If the low-signal is, as seen in FIG. 3, supplied to an inverter 2a provided in the on-detecting circuit 4 and is then converted into a high-signal.

The high-signal converted in the inverter 2a is divided to be inputted into inverters 2b and 2c. The high-signal inputted into the inverter 2b is converted into a low-signal, and the converted low-signal is supplied to an input port of a NAND gate 20. The high-signal inputted into the inverter 2c is converted into a low-signal. However, the converted low-signal is not supplied to an inverter 2d and, in lieu thereof, the high-signal stored in a capacitor C1 is supplied to the inverter 2d.

The high-signal stored in the capacitor C1 is supplied to the inverter 2d and then is converted into a low-signal to be inputted into the other input port of the NAND gate 20, and thereby, the emergency stop signal is detected (S02). The NAND gate 20 outputs a high pulse signal 23 by means of the two low-signals.

If the contact switch of the emergency stop switch 1 is opened, a high-signal is supplied to the off-detecting circuit 5 shown in FIG. 4. The high-signal supplied to the off-detecting circuit 5 is inputted into one input port of a NAND gage 30; and a divided high-signal 31 is converted into a low-signal passing through an inverter 3a. The low-signal converted through the inverter 3a is not supplied to an inverter 3b, and in lieu thereof, the high-signal stored in a capacitor C2 is supplied into the inverter 3b. The high-signal is converted into a low-signal through the inverter 3b, and the low-signal is converted into a high-signal passing through an inverter 3c and is inputted into the other input port of the NAND gate 30, outputting a low pulse signal 33.

Hereinbelow, the present invention will be described in more detail with respect to FIGS. 5 and 6 together with FIGS. 2 through 4.

Figure 5:
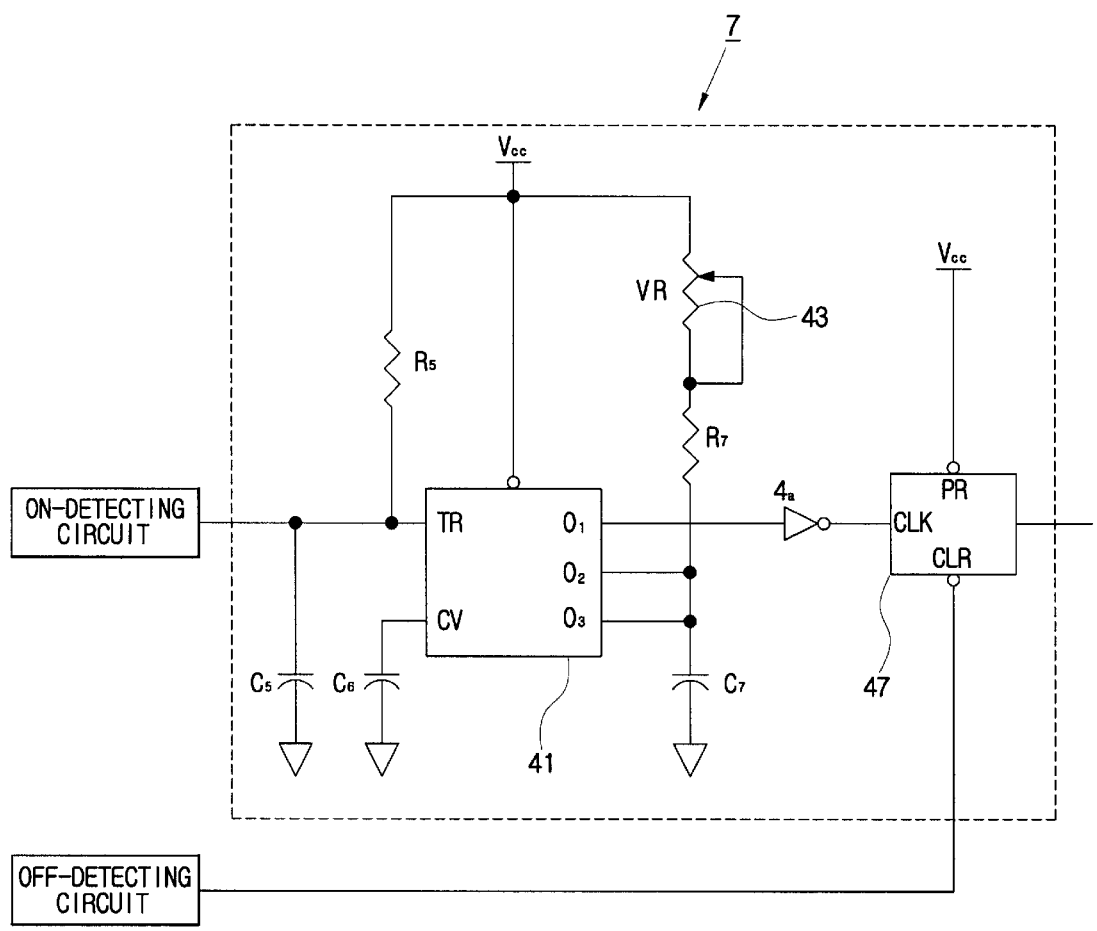
FIG. 5 is a circuit diagram of delaying an emergency stop signal for the emergency stop device of FIG. 1.

If the high-pulse signal 23 detected by the on-detecting circuit 3 is, as shown in FIG. 5, inputted into the delay circuit 7, a timer 41 is activated so as to adjust an output time of the high-pulse signal 23 by means of a variable resistor 43. The timer 41 delays the stop operation of the AGV for a predetermined time according to a set up value by the variable resistor 43.

If the high pulse signal 23 delayed by the delay circuit 7 is converted into a low-signal by an inverter 4a and is then inputted into a clock input port of a flip-flop (F/F) 47, which is a temporary storage, a high-signal is outputted from the flip-flop 47 responsive to the signal inputted into the clock input port. The high-signal output from the flip-flop 47 is, as shown in FIG. 6, converted into a low-signal by an inverter 5a, and is inputted into the emergency stop driving circuit 9 so as to activate the emergency stop driver (S03).

If a photo coupler 51 emits light by a current flowing in a photo diode 54 of the photo coupler 51 according to the low-signal inputted into the emergency stop driving circuit 9, a photo transistor 55 is turned on by the photo diode 54. If the photo transistor 55 is turned on, the current flows into a collector of the photo transistor 55, a relay switch 53 connected to the collector of the photo transistor 55 is turned on, and the emergency stop signal is then inputted into the external connector 11 of the microcomputer, thereby interrupting the power supplied to the driver (S04).

If a release of emergency stop is selected (S05) and a high-signal is inputted through the emergency stop switch 1, the off-detecting circuit 5 is activated, outputting a low pulse signal 33, and the flip-flop 47 of the delay circuit 7 is initiated, outputting a high-signal. The high-signal is converted into a low-signal by the inverter 5a and the photo coupler 51, and the low-signal is inputted into the emergency stop driving circuit, and the relay switch 53 is then opened; the release signal of the emergency stop is inputted into the microcomputer through the external connector 11, thereby supplying power to the driver (S06).

Figure 6:
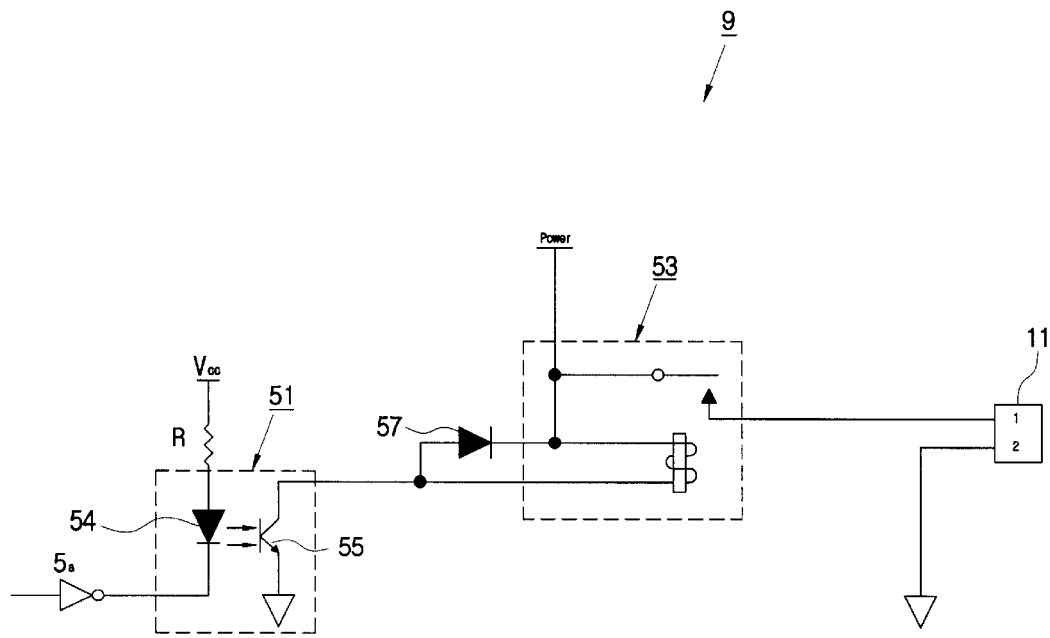
FIG. 6 is a circuit diagram of driving the emergency stop device of FIG. 1.

Here, the diode 57 within the emergency stop driving circuit of FIG. 6 prevents the current from flowing in reverse when the relay switch 53 is opened.

With this configuration, where an emergency situation such as stoppage of the CPU occurs, the driver of the AGV can be stopped by the emergency stop switch, and therefore, the AGV can be more safely stopped.

As described above, according to the present invention there are provided an automated-guided vehicle and a method for controlling the same, where an emergency situation such as stoppage of the CPU occurs, the driver of the AGV can be stopped by the emergency stop switch, and therefore, the AGV can be more safely stopped.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. An automated-guided vehicle having a driver, comprising:

an emergency stop switch selecting an emergency stop or a release of the emergency stop of the driver;

a state detector part detecting a selection state of the emergency stop switch; and an emergency stop driving circuit stopping in an emergency an operation of the driver or releasing the emergency stop of the driver according to a detection signal from the state detector part, wherein the state detector part comprises a circuit detecting the emergency stop signal and a circuit detecting a release signal of the emergency stop.

2. The automated-guided vehicle according to claim 1, further comprising a delay circuit supplying an emergency stop signal from the state detector part to the emergency stop driving circuit, after delaying the emergency stop signal for a predetermined time.

3. The automated-guided vehicle according to claim 2, wherein the delay circuit comprises a timer adjusting a time delay.

4. The automated-guided vehicle according to claim 3, wherein the delay circuit further comprises a flip-flop (F/F) to temporarily store the emergency stop signal or the release signal of the emergency stop.

5. The automated-guided vehicle according to claim 1, wherein the state detector part comprises at least one inverter converting the detection signal, a resistor and a capacitor storing the converted detection signal and delaying the detection signal for a predetermined time, and a logic gate receiving the delayed detection signal and outputting a pulse signal.

6. The automated-guided vehicle according to claim 5, wherein the emergency stop signal is converted by one of the at least one inverter in the circuit detecting the emergency stop signal and divided into a first signal and a second signal, where the first and second signals pass through the at least one inverter, a first input port of the logic gate receives the inverted first signal, a resistor and a capacitor receive the inverted second signal, a second input port of the logic gate receives the inverted second signal from the capacitor, and the logic gate outputs an on-pulse signal to drive the delay circuit in response to the inverted first signal and the inverted second signal.

7. The automated-guided vehicle according to claim 6, wherein the logic gate comprises a NAND gate.

8. The automated-guided vehicle according to claim 1, wherein the circuit detecting the release signal of the emergency stop comprises at least one inverter, a resistor, a capacitor, and a logic gate.

9. The automated-guided vehicle according to claim 8, wherein the release signal of the emergency stop is divided in the circuit detecting the release signal of the emergency stop into a first signal and a second signal, the first signal is inputted into a first input port of the logic gate, the second signal is inputted into a resistor and a capacitor through the at least one inverter and inputted into a second input port of the logic gate, where the logic gate outputs an off pulse signal in response to the first signal and the inverted second signal to release the emergency stop.

10. The automated-guided vehicle according to claim 9, wherein the logic gate comprises a NAND gate.

11. The automated-guided vehicle according to claim 1, wherein the circuit detecting the emergency stop signal comprises:
    a first inverter receiving the emergency stop selection signal and converting the signal to a first state signal,
    a second inverter receiving the first state signal from the first inverter and converting the first state signal to a second state signal,
    a capacitor storing the first state signal,
    a third inverter receiving the first state signal from the capacitor and converting the first state signal to a third state signal, the third state signal being a same state as the second state signal, and
    a logic gate receiving the second and third state signals to output the emergency stop signal.

12. The automated-guided vehicle according to claim 11, wherein the first state signal comprises a high-signal and the second and third state signals comprise a low-signal.

13. The automated-guided vehicle according to claim 11, wherein the logic gate comprises a NAND gate.

14. The automated-guided vehicle according to claim 11, wherein the emergency stop driving circuit comprises:
    a photo diode,
    a photo coupler emitting light by a current flowing through the photo diode in the photo coupler according to the emergency stop signal from the circuit detecting the emergency stop signal,
    a photo transistor in the photo coupler turned on by the photo diode, and
    a relay switch connected to the collector of the photo transistor transmitting the emergency stop signal to interrupt a power supplied to the driver.

15. The automated-guided vehicle according to claim 14, wherein the emergency stop driving circuit further comprises:
    a diode preventing current from flowing in a reverse direction when the relay switch is opened.

16. The automated-guided vehicle according to claim 1, wherein the circuit detecting the release signal of the emergency stop comprises:
    a first inverter receiving a first state signal and converting the signal to a second state signal,
    a capacitor storing the first state signal,
    a second inverter receiving the first state signal from the capacitor and converting the first state signal to a third state signal, the third state signal having a same state as the second state signal,
    a third inverter receiving the third state signal from the second inverter and converting the third state signal to a fourth state signal, the fourth state signal having a same state as the first state signal, and
    a logic gate receiving the first and fourth state signals to output the release signal of the emergency stop.

17. The automated-guided vehicle according to claim 16, wherein the first and fourth state signals comprise high-signals and the second and third state signals comprise low-signals or the first and fourth state signals comprise low-signals and the second and third state signals comprise high-signals.

18. The automated-guided vehicle according to claim 16, wherein the logic gate comprises a NAND gate.

19. A method of controlling an emergency stop of an automated-guided vehicle having a driver, comprising:
    selecting an emergency stop or a release of the emergency stop of the driver;
    detecting an emergency stop signal generated according to the selection of the emergency stop;
    storing the emergency stop signal;
    converting the emergency stop signal to a pulse signal;
    delaying the pulse signal for a predetermined time;
    activating an emergency stop driving circuit in response to the pulse signal; and
    turning off a power supply to the driver in response to the activation of the emergency stop driving circuit.

20. The method according to claim 19, further comprising:
    releasing the emergency stop; and
    supplying the power to the driver in response to the release of the emergency stop.

* * * * *